(12) United States Patent
Campbell

(10) Patent No.: US 8,340,430 B2
(45) Date of Patent: *Dec. 25, 2012

(54) METHODS AND SYSTEMS FOR IDENTIFYING DIGITAL IMAGE CHARACTERISTICS

(75) Inventor: Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 11/775,773

(22) Filed: Jul. 10, 2007

(65) Prior Publication Data

US 2009/0016611 A1    Jan. 15, 2009

(51) Int. Cl.
*G06K 9/46* (2006.01)
*G06K 9/36* (2006.01)
(52) U.S. Cl. .......................... 382/190; 382/291
(58) Field of Classification Search .............. 382/289, 382/290, 291, 293, 295, 296, 297, 135, 137, 382/151, 170, 173, 157, 176, 177, 178, 179, 382/180, 185, 186, 187, 190, 209, 215, 216, 382/218, 219, 229, 231, 278, 282, 287; 358/453, 358/462, 488, 496, 648, 649, 657, 659
See application file for complete search history.

(56) References Cited

U.S. PATENT DOCUMENTS

| | | | |
|---|---|---|---|
| 5,020,117 A | 5/1991 | Ooi | |
| 5,031,225 A | 7/1991 | Tachikawa | |
| 5,060,276 A | 10/1991 | Morris | |
| 5,077,811 A | 12/1991 | Onda | |
| 5,168,147 A * | 12/1992 | Bloomberg | 235/456 |
| 5,191,438 A | 3/1993 | Katsuranda | |
| 5,235,651 A | 8/1993 | Nafarieh | |
| 5,245,165 A * | 9/1993 | Zhang | 235/454 |
| 5,251,268 A | 10/1993 | Colley | |
| 5,276,742 A | 1/1994 | Dasari | |
| 5,319,722 A | 6/1994 | Oki | |
| 5,375,176 A | 12/1994 | Spitz | |
| 5,425,110 A | 6/1995 | Spitz | |
| 5,444,797 A | 8/1995 | Spitz et al. | |
| 5,471,549 A | 11/1995 | Kurosu | |
| 5,508,810 A | 4/1996 | Sato | |
| 5,664,027 A * | 9/1997 | Ittner | 382/170 |
| 5,689,585 A * | 11/1997 | Bloomberg et al. | 382/229 |
| 5,710,865 A | 1/1998 | Abe | |
| 5,828,771 A * | 10/1998 | Bloomberg | 382/112 |

(Continued)

FOREIGN PATENT DOCUMENTS

EP    1073001    1/2001

(Continued)

OTHER PUBLICATIONS

Yalin Wang; Haralick, R.; Phillips, I.T.; , "Zone content classification and its performance evaluation," Document Analysis and Recognition, 2001. Proceedings. Sixth International Conference on , vol., no., pp. 540-544, 2001.*

(Continued)

*Primary Examiner* — Vu Le
*Assistant Examiner* — Andrae S Allison
(74) *Attorney, Agent, or Firm* — Kristine Elizabeth Matthews; David C. Ripma

(57) ABSTRACT

Aspects of the present invention relate to methods and systems for determining image characteristics in a digital image.

11 Claims, 8 Drawing Sheets

U.S. PATENT DOCUMENTS

| | | | |
|---|---|---|---|
| 5,835,632 | A | 11/1998 | Takasu |
| 5,889,884 | A | 3/1999 | Hashimoto |
| 5,911,005 | A | 6/1999 | Uchiyama |
| 5,930,001 | A | 7/1999 | Satoh |
| 5,982,929 | A | 11/1999 | Ilan et al. |
| 5,987,171 | A | 11/1999 | Wang |
| 6,011,877 | A | 1/2000 | Ishikawa |
| 6,064,767 | A | 5/2000 | Muir et al. |
| 6,101,270 | A | 8/2000 | Takahashi |
| 6,104,832 | A | 8/2000 | Saito |
| 6,125,362 | A | 9/2000 | Elworthy |
| 6,137,905 | A | 10/2000 | Takaoka |
| 6,151,423 | A | 11/2000 | Melen |
| 6,167,369 | A | 12/2000 | Schulze |
| 6,169,822 | B1 | 1/2001 | Jung |
| 6,173,088 | B1 | 1/2001 | Koh |
| 6,256,398 | B1 * | 7/2001 | Chang ............... 382/100 |
| 6,266,441 | B1 | 7/2001 | Hashimoto |
| 6,304,681 | B1 | 10/2001 | Akiba |
| 6,320,983 | B1 | 11/2001 | Matsuno |
| 6,360,028 | B1 | 3/2002 | Kaji |
| 7,031,553 | B2 | 5/2002 | Myers et al. |
| 6,411,743 | B1 | 6/2002 | Koh |
| 6,501,864 | B1 | 12/2002 | Eguchi |
| 6,574,375 | B1 | 6/2003 | Cullen |
| 6,624,905 | B1 * | 9/2003 | Ikegami et al. ............. 358/1.13 |
| 6,704,698 | B1 | 3/2004 | Paulsen, Jr. et al. |
| 6,714,677 | B1 * | 3/2004 | Stearns et al. ............... 382/181 |
| 6,798,905 | B1 * | 9/2004 | Sugiura et al. ............... 382/168 |
| 6,804,414 | B1 * | 10/2004 | Sakai et al. .................. 382/289 |
| 6,941,030 | B2 | 9/2005 | Kakutani et al. |
| 6,993,205 | B1 | 1/2006 | Lorie |
| 7,151,860 | B1 | 12/2006 | Sakai |
| 7,305,619 | B2 | 12/2007 | Kaneda et al. |
| 7,379,603 | B2 * | 5/2008 | Ross et al. ................... 382/229 |
| 7,567,730 | B2 | 7/2009 | Ohguro |
| 7,580,571 | B2 | 8/2009 | Ohguro |
| 2001/0013938 | A1 | 8/2001 | Usami |
| 2001/0028737 | A1 | 10/2001 | Takakura |
| 2003/0049062 | A1 | 3/2003 | Machida |
| 2003/0086721 | A1 | 5/2003 | Guillemin |
| 2003/0152289 | A1 | 8/2003 | Lou |
| 2003/0210437 | A1 | 11/2003 | Machida |
| 2004/0001606 | A1 | 1/2004 | Levy |
| 2004/0179733 | A1 * | 9/2004 | Okubo .......................... 382/180 |
| 2004/0218836 | A1 | 11/2004 | Kanatsu |
| 2005/0041865 | A1 | 2/2005 | Zhen et al. |
| 2005/0163399 | A1 | 7/2005 | Aradhye |
| 2006/0018544 | A1 | 1/2006 | Ohguro |
| 2006/0033967 | A1 | 2/2006 | Brunner |
| 2006/0204110 | A1 | 9/2006 | Steinberg et al. |
| 2006/0210195 | A1 | 9/2006 | Ohguro |
| 2006/0215230 | A1 | 9/2006 | Borrey |
| 2006/0287848 | A1 | 12/2006 | Li et al. |

FOREIGN PATENT DOCUMENTS

| | | |
|---|---|---|
| GB | 2383223 | 6/2003 |
| JP | 62-224870 A | 10/1987 |
| JP | 01-250184 A | 10/1989 |
| JP | 06-131496 A | 5/1994 |
| JP | 07-065120 A | 3/1995 |
| JP | 10-224595 A | 8/1998 |
| JP | 11-195087 A | 7/1999 |
| JP | 2005-063419 A | 3/2005 |
| JP | 2005-346607 A | 12/2005 |

OTHER PUBLICATIONS

Japanese Office Action—Patent Application No. 2008-179231—Mailing Date Aug. 17, 2010.

A. Lawrence Spitz, "Determination of the Script and Language Content of Document Images," IEEE Transactions on Pattern Analysis and Machine Intelligence, Mar. 1997, pp. 235-245, vol. 19, No. 3, IEEE, USA.

Japanese Office Action—Decision to Grant Patent—Patent Application No. 2008-179231—Mailing Date Dec. 6, 2011.

Japanese Office Action—Patent Application No. 2009-139107—Mailing Date May 31, 2011.

USPTO Notice of Allowance—U.S. Appl. No. 12/164,985—Mailing Date Oct. 12, 2011.

* cited by examiner

METHODS AND SYSTEMS FOR IDENTIFYING DIGITAL IMAGE CHARACTERISTICS

FIELD OF THE INVENTION

Embodiments of the present invention comprise methods and systems for determining digital image characteristics.

BACKGROUND

Page orientation in an electronic document may not correspond to page orientation in the original document, referred to as the nominal page orientation, due to factors which may comprise scan direction, orientation of the original document on the imaging device platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example optical character recognition (OCR), may require input data of a specific orientation. Additionally, if the page orientation of an electronic document is unknown relative to the nominal page orientation, proper orientation for display on a viewing device, for example a computer monitor, handheld display and other display devices, may not be achieved.

SUMMARY

Some embodiments of the present invention comprise methods and systems for determining text orientation in a digital image using a measure of the distribution of glyph features. Other embodiments of the present invention comprise methods and systems for determining the language or language family of the text in an electronic document using a measure of the distribution of glyph features. Some embodiments of the present invention comprise methods and systems which may use supervised training methods to build a prototypical distribution of glyph features over a page or a text region from a set of training data samples.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Page orientation in an electronic document, also considered a document image, text image or image, may not correspond to page orientation in the original document, referred to as the nominal page orientation, due to factors which may comprise scan direction, orientation of the original document on the scanner platen and other factors. The discrepancy between the page orientation in the electronic document and the nominal page orientation may lead to an undesirable, an unexpected, a less than optimal or an otherwise unsatisfactory outcome when processing the electronic document. For example, the difference in orientation may result in an undesirable outcome when a finishing operation is applied to a printed version of the electronic document. Exemplary finishing operations may comprise binding, stapling and other operations. Furthermore, in order to perform at an acceptable level of accuracy, some image processing operations, for example optical character recognition (OCR), may require input data in a specific orientation. Additionally, if the page orientation of an electronic document is unknown relative to the nominal page orientation, proper orientation for display on a viewing device, for example a computer monitor, handheld display and other display devices, may not be achieved.

Some embodiments of the present invention relate to automatic detection of a dominant text orientation in an electronic document. Text orientation may be related to the nominal page orientation.

During scanning, copying and other digital imaging processes, a document may be placed on the platen or in the document feeder of an imaging device in a non-standard orientation such that the electronic reproduction, also considered the scan, may be flipped or rotated from the normal, reading orientation.

Figure 1A:
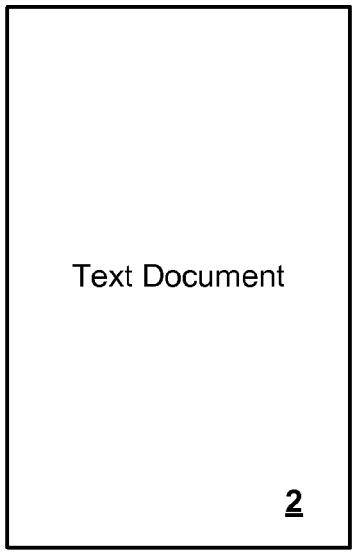
FIG. 1A is a drawing showing an exemplary text document in a "readable" orientation.
Figure 1B:
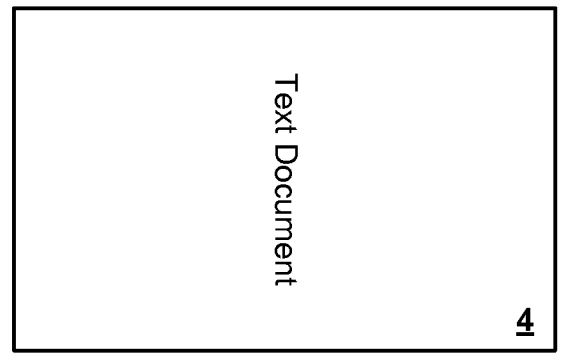
FIG. 1B is a drawing showing an exemplary text document in an orientation rotated 90 degrees clockwise from the "readable" orientation.
Figure 1C:
FIG. 1C is a drawing showing an exemplary text document in an orientation rotated 180 degrees clockwise from the "readable" orientation.
Figure 1D:
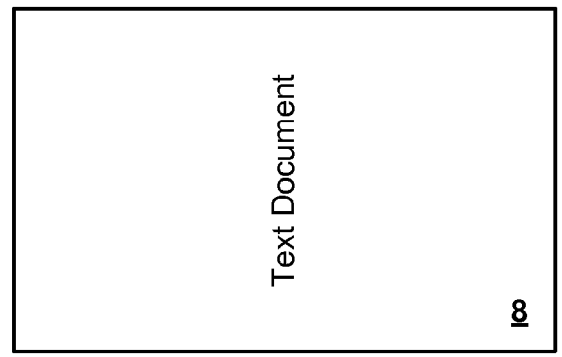
FIG. 1D is a drawing showing an exemplary text document in an orientation rotated 90 degrees counter clockwise from the "readable" orientation.

FIGS. 1A-1D depict several document orientations in relation to a readable orientation, also considered the "up" orientation. FIG. 1A shows an exemplary text document 2 in a readable orientation, also considered a 0° orientation. FIG. 1B shows an exemplary text document 4 in a rotated 90° orientation, also considered a rotated clockwise 90° orientation, a rotated counter clockwise 270° orientation, a rotated right 90° orientation and a rotated left 270° orientation. FIG. 1C shows an exemplary text document 6 in a rotated 180° orientation, also considered an inverted orientation. FIG. 1D shows an exemplary text document 8 in a rotated 270° orientation, also considered a rotated clockwise 270° orientation, a rotated counter clockwise 90° orientation, a rotated right 270° orientation and a rotated left 90° orientation.

Rotated electronic pages may require a user to manually correct orientation by physically rotating the original document in the case of a copy or digitally flipping or rotating a page in document viewer or other image or document processing application in the case of a scan.

Some embodiments of the present invention may determine whether an electronic document is in the readable orientation, rotated 90°, rotated 180° or rotated 270°. Some embodiments of the present invention may determine the language or language family of the text on the page.

Some embodiments of the present invention may determine page orientation in an electronic document using a measure of the distribution of glyph features. Other embodiments of the present invention may determine the language or language family of the text in an electronic document using a measure of the distribution of glyph features. Some embodiments of the present invention may use supervised training methods to build a prototypical distribution of glyph features over a page or a text region from a set of training data samples. For each training sample, the orientation of the text in the training sample and the language or language family of the text in the training sample may be provided. The training data may form a library of prototypical page, or other region, feature distributions. Embodiments of the present invention may use the library of prototypical page, or other region, feature distributions to match to page, or other region, distributions of data.

Some embodiments of the present invention may use binary corner patterns and may encode the quadrant location relative to a glyph reference position to encode character asymmetry. Some embodiments of the present invention may use of the number of glyph binary corner pattern distributions for language classification to detect the language or the language family of text data. Some embodiments of the present invention may use binary corner patterns to train a classifier and to build orientation prototypes.

Figure 2:
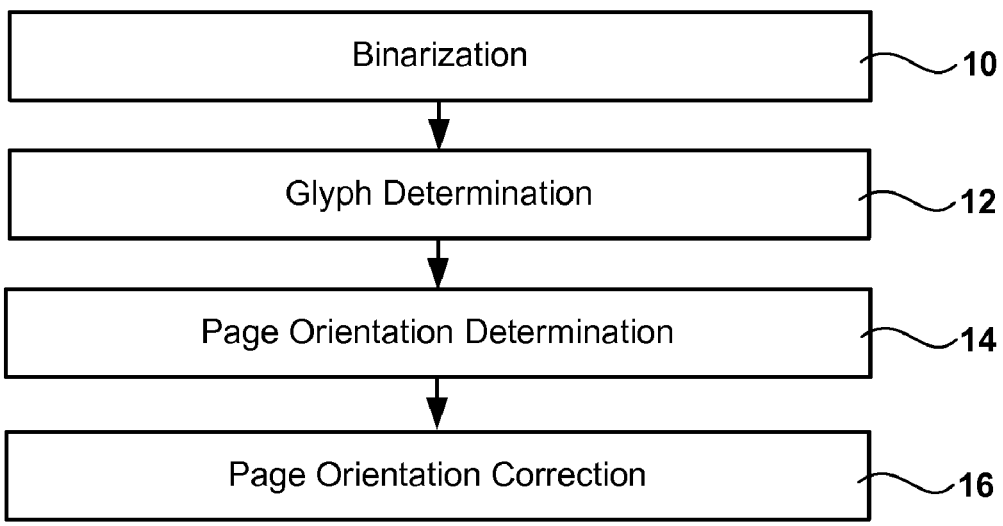
FIG. 2 is a chart showing embodiments of the present invention comprising document orientation correction.

Some embodiments of the present invention may be described in relation to FIG. 2. An electronic document image may be binarized 10. Exemplary binarization methods may comprise locally adaptive binarization methods, including the local methods of Bernsen, Chow and Kaneko, Eikvil et al., Mardia and Hainsworth, Niblack, Taxt et al., Yanowitz and Bruckstein, Parker, White and Rohrer's dynamic thresholding algorithm, White and Rohrer's integrated function algorithm and other local methods, and global binarization methods, including the global methods of Abutaleb, Kapur et al., Kittler and Illingworth, Otsu and other global methods. In some embodiments of the present invention, binarization may comprise block-based Otsu binarization using 32×32 pixel blocks.

Binarization 10 may be followed by glyph determination 12. A glyph may be an individual character or symbol used in a written language. During glyph determination 12, the binarization result may be processed by a connected-component algorithm to identify, also considered label, glyph components. Glyph determination 12 may also comprise calculation of glyph-component properties. Exemplary glyph-component properties may include glyph-component bounding box, glyph-component area, glyph-component centroid, glyph-component bounding box area, glyph-component bounding box center and other properties. A single glyph component may comprise a single glyph character. Due to image noise or other factors, a single glyph component may comprise multiple glyph characters or non-glyph content, or a single glyph character may be split about multiple components.

Page orientation may be determined 14 from the glyph components and the glyph-component properties. The electronic document image may be corrected 16 according to the detected page orientation to place the electronic document image in a readable, or otherwise desirable, orientation.

Figure 3:
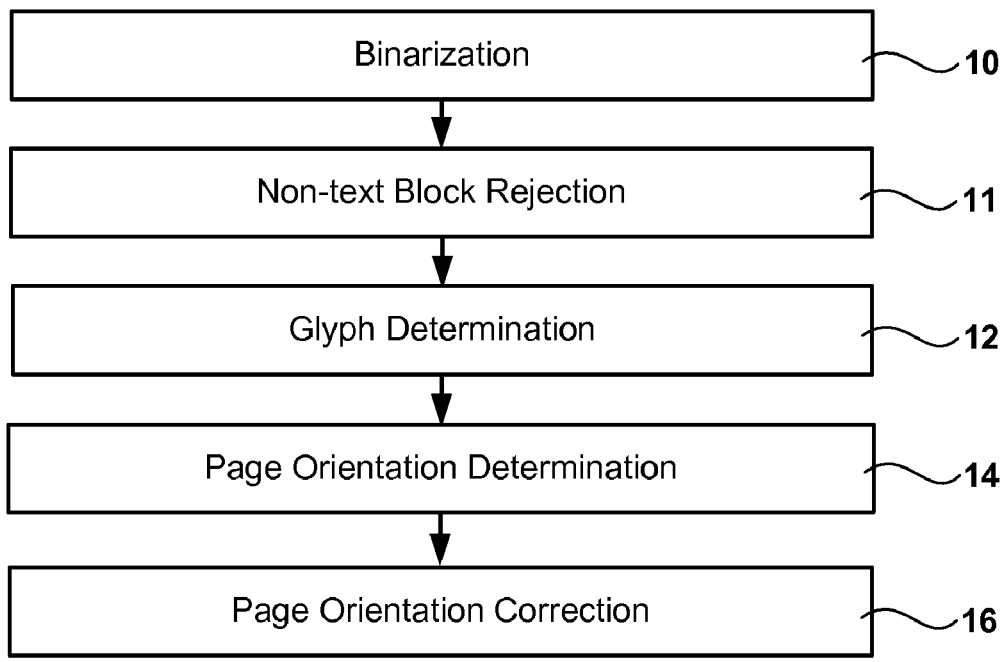
FIG. 3 is a chart showing embodiments of the present invention comprising non-text rejection after image binarization.

In some embodiments of the present invention described in relation to FIG. 3, block-level filtering 11 to reject non-text blocks may be performed after binarization 10 and prior to glyph determination 12. In some embodiments of the present invention, block-level filtering 11 may comprise rejecting blocks that do not meet a within-block contrast criterion or a quality of two class fit.

Figure 4:
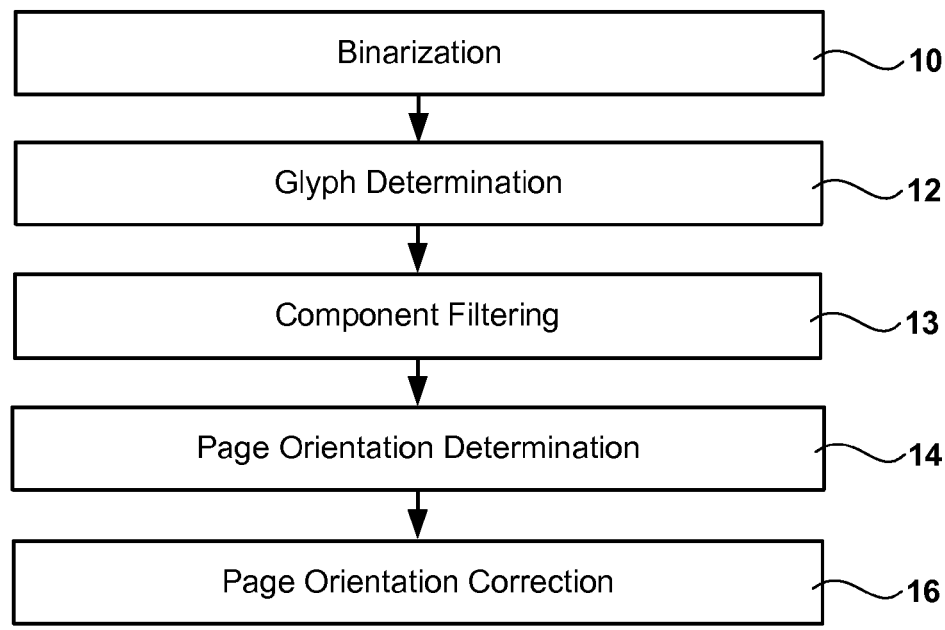
FIG. 4 is a chart showing embodiments of the present invention comprising component filtering.

In some embodiments of the present invention described in relation to FIG. 4, component filtering 13 to reject glyph components that may be noise may be performed after glyph determination 12 and prior to page orientation determination 14. In some embodiments of the present invention, component filtering 13 may comprise rejecting glyph components that meet a size criterion. Exemplary size criteria may include size below a threshold, size above a threshold based on median component area, glyph width below a threshold and other size criterion.

Some embodiments of the present invention may comprise both block-level filtering and component filtering.

In some embodiments of the present invention, page orientation determination 14 may be based on the distribution of binary feature points for a glyph component relative to a glyph component reference point. In some embodiments of the present invention described in relation to FIG. 5A, the reference point for a glyph component 30 may be the center 32 of the glyph component bounding box 34. The center, which may be denoted $(c_x, c_y)$, 32 of the glyph component bounding box 34 may be determined according to:

$$c_x = \frac{\max_x\{glyph\} - \min_x\{glyph\}}{2}, c_y = \frac{\max_y\{glyph\} - \min_y\{glyph\}}{2},$$

where {glyph} may denote the set of pixels that may comprise the glyph component.

Figures 5A, 5B:
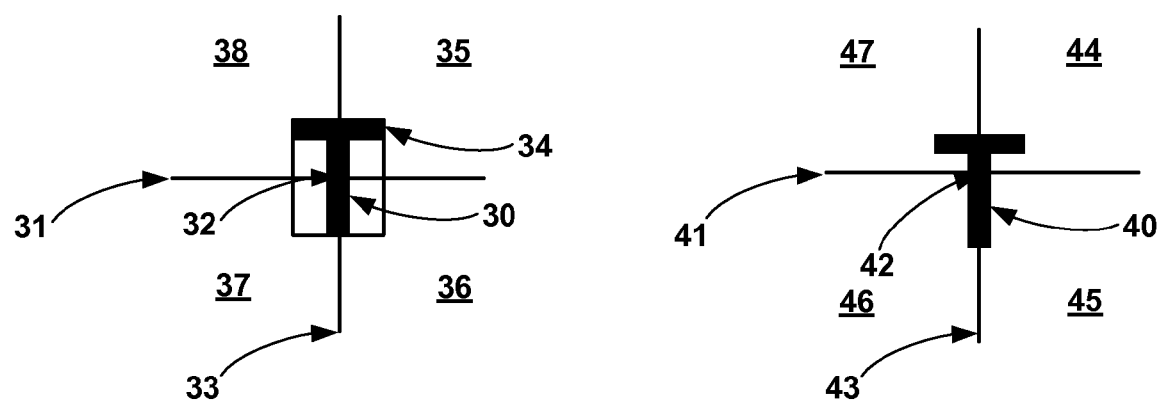
FIG. 5A is a drawing showing an exemplary glyph component with a glyph component reference point at the center of the glyph component bounding box.
FIG. 5B is a drawing showing an exemplary glyph component with a glyph component reference point at the centroid of the glyph component.
Figure 6A:
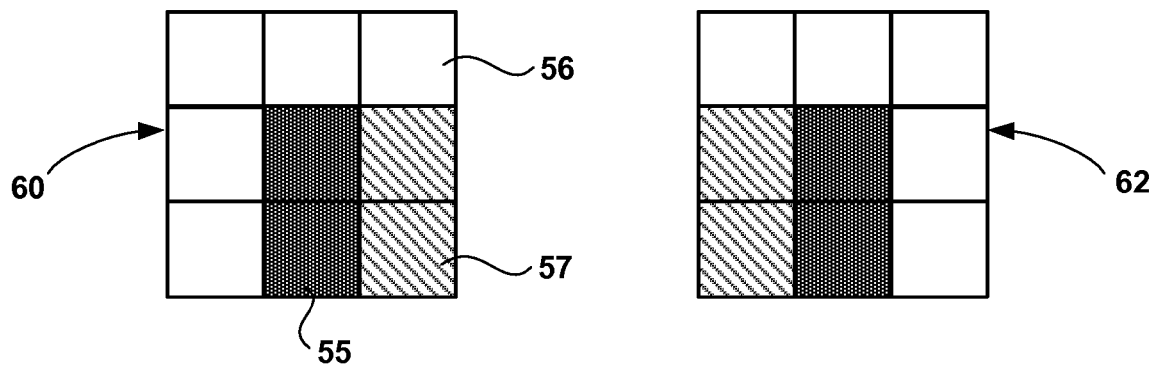
FIG. 6A is a drawing showing exemplary pixel patterns corresponding to a glyph feature which may be referred to as "upward pointing;"
Figure 6B:
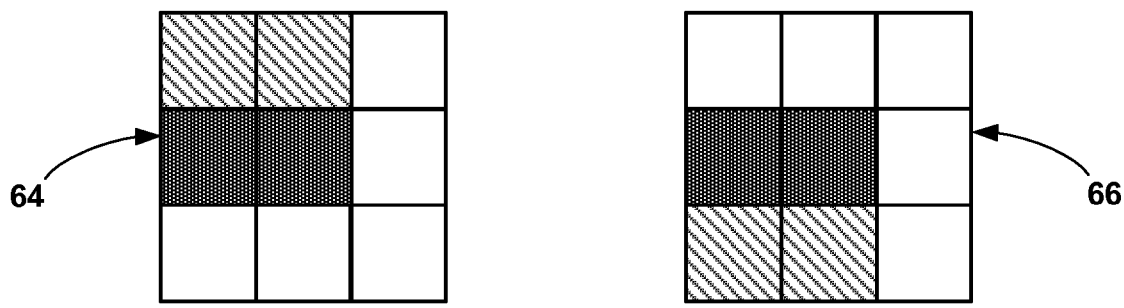
FIG. 6B is a drawing showing exemplary pixel patterns corresponding to a glyph feature which may be referred to as "rightward pointing;"
Figure 6C:
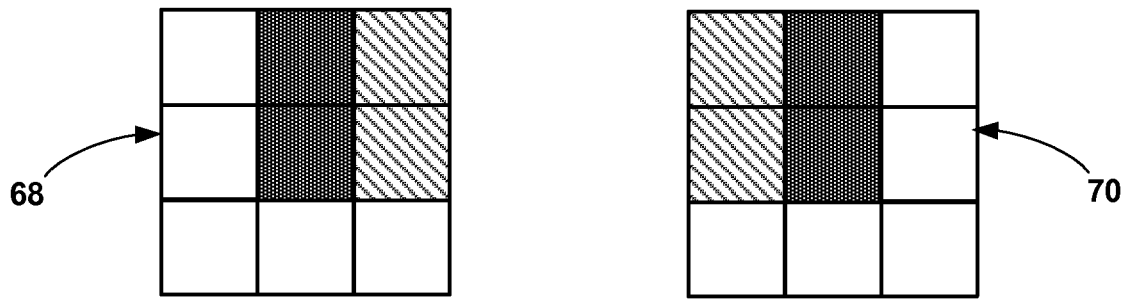
FIG. 6C is a drawing showing exemplary pixel patterns corresponding to a glyph feature which may be referred to as "downward pointing;"
Figure 6D:
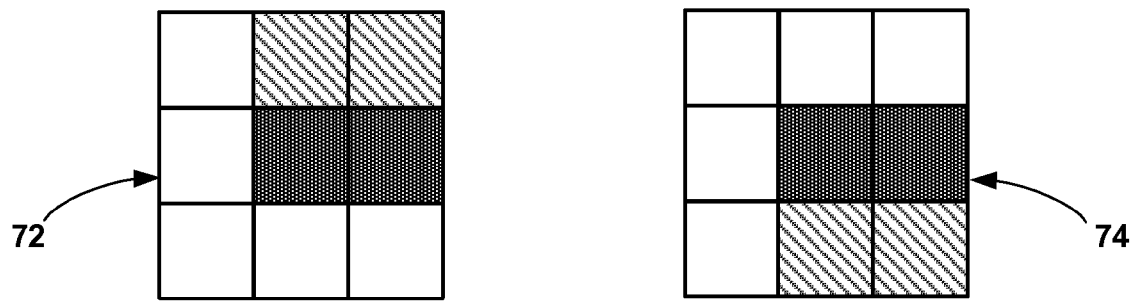
FIG. 6D is a drawing showing exemplary pixel patterns corresponding to a glyph feature which may be referred to as "leftward pointing;"
Figures 6E, 6F:
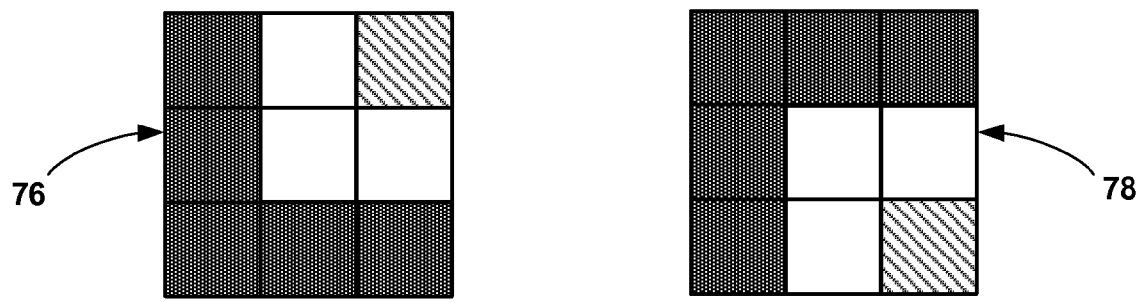
FIG. 6E is a drawing showing an exemplary pixel pattern corresponding to a glyph feature which may be referred to as "up-right open;"
FIG. 6F is a drawing showing an exemplary pixel pattern corresponding to a glyph feature which may be referred to as "down-right open;"
Figures 6G, 6H:
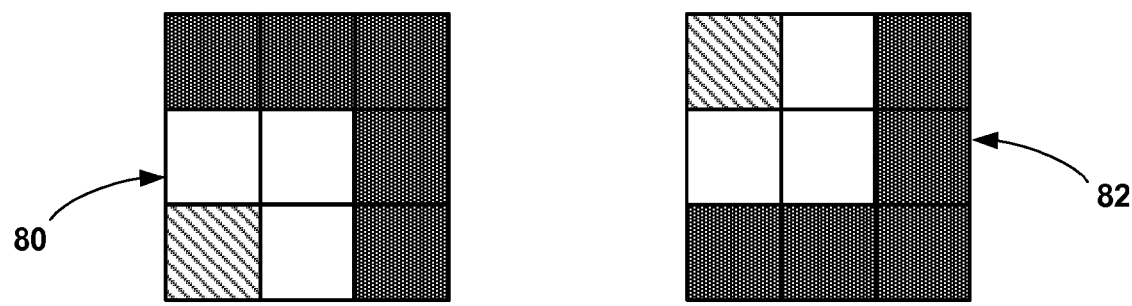
FIG. 6G is a drawing showing an exemplary pixel pattern corresponding to a glyph feature which may be referred to as "down-left open;"
FIG. 6H is a drawing showing an exemplary pixel pattern corresponding to a glyph feature which may be referred to as "up-left open;"

In alternative embodiments of the present invention described in relation to FIG. 5B, the reference point for a glyph component 40 may be the centroid 42 of the glyph component 40. The centroid, which may be denoted $(c_x, c_y)$, 42 of the glyph component 40 may be determined according to:

$$c_x = \frac{\sum_x \{glyph\}}{area}, c_y = \frac{\sum_y \{glyph\}}{area},$$

where area may denote the area of the glyph component 40.

In some embodiments of the present invention, the relative placement of a feature point in a glyph component may be described in relation to the reference point for the glyph component. In some embodiments of the present invention, the placement of a feature point in a glyph component may be described by the quadrant in which the feature point is located. In an exemplary of the present invention, the glyph component reference point may be the origin of the quadrant decomposition.

In FIG. 5A, the reference point 32 may be the center of the glyph component bounding box 34. For an exemplary raster-scan coordinate system, which may be a coordinate system with the origin in the upper-left corner of the image with positive-x coordinates corresponding to horizontal location within the image and positively coordinates corresponding to vertical location with in the image, the quadrant of a feature point, which may be denoted (fx, fy), may be determined according to:

upper-right quadrant 35 if $(fx-c_x) \geq 0$ and $(fy-c_y) \leq 0$;
lower-right quadrant 36 if $(fx-c_x) \geq 0$ and $(fy-c_y) \geq 0$;
lower-left quadrant if 37 $(fx-c_x) \leq 0$ and $(fy-c_y) \geq 0$;
upper-left quadrant if 38 $(fx-c_x) \leq 0$ and $(fy-c_y) \leq 0$.

In some embodiments of the present invention, if a feature point is located on a quadrant dividing line 31, 33, then the feature point may be considered to be located in both quadrants. In alternative embodiments of the present invention, if a feature point is located on a quadrant dividing line 31, 33, then the feature point may be considered to be located in a default quadrant in relation to the dividing line.

In some embodiments of the present invention, if a feature point is located on the glyph component reference point 32, then the feature point may be considered to be located in all four quadrants. In alternative embodiments of the present invention, if a feature point is located on the glyph component reference point 32, then the feature point may be considered to be located in a default quadrant.

In FIG. 5B, the reference point 42 may be the centroid of the glyph component 40. For an exemplary raster-scan coordinate system, which may be a coordinate system with the origin in the upper-left corner of the image with positive-x coordinates corresponding to horizontal location within the image and positive-y coordinates corresponding to vertical location with in the image, the quadrant of a feature point, which may be denoted (fx, fy), may be determined according to:

upper-right quadrant 44 if $(fx-c_x) \geq 0$ and $(fy-c_y) \leq 0$;
lower-right quadrant 45 if $(fx-c_x) \geq 0$ and $(fy-c_y) \geq 0$;
lower-left quadrant if 46 $(fx-c_x) \leq 0$ and $(fy-c_y) \geq 0$;
upper-left quadrant if 47 $(fx-c_x) \leq 0$ and $(fy-c_y) \leq 0$.

In some embodiments of the present invention, if a feature point is located on a quadrant dividing line 41, 43, then the feature point may be considered to be located in both quadrants. In alternative embodiments of the present invention, if a feature point is located on a quadrant dividing line 41, 43, then the feature point may be considered to be located in a default quadrant in relation to the dividing line.

In some embodiments of the present invention, if a feature point is located on the glyph component reference point 42, then the feature point may be considered to be located in all four quadrants. In alternative embodiments of the present invention, if a feature point is located on the glyph component reference point 42, then the feature point may be considered to be located in a default quadrant.

In some embodiments of the present invention, pixel-pattern-based features may be used in determining page orientation. FIGS. 6A-6H depict twelve exemplary 3×3 patterns which may be associated with eight exemplary pattern features. The patterns 60, 62 shown in FIG. 6A may be associated with a glyph feature which may be referred to as "upward pointing." The patterns 64, 66 shown in FIG. 6B may be associated with a glyph feature which may be referred to as "rightward pointing." The patterns 68, 70 shown in FIG. 6C may be associated with a glyph feature which may be referred to as "downward pointing." The patterns 72, 74 shown in FIG. 6D may be associated with a glyph feature which may be referred to as "leftward pointing." The pattern 76 shown in FIG. 6E may be associated with a glyph feature which may be referred to as "up-right open." The pattern 78 shown in FIG. 6F may be associated with a glyph feature which may be referred to as "down-right open." The pattern 80 shown in FIG. 6G may be associated with a glyph feature which may be referred to as "down-left open." The pattern 82 shown in FIG. 6H may be associated with a glyph feature which may be referred to as "up-left open."

A pixel in a glyph component may be considered a feature point associated with a particular feature when the pixel and its surrounding 8-nearest-neighbors match any of the patterns associated with the particular feature. The pixel may be considered the center pixel in the feature pattern. A pattern associated with a feature may be described by pixels that correspond to non-glyph pixels in a glyph component, pixels that correspond to glyph pixels in the glyph component and pixels that correspond to either glyph or non-glyph pixels, also considered "don't care" pixels, in the glyph component. In the exemplary patterns shown in FIGS. 6A-6H, the non-glyph pixels may be pixels shown in the pattern by a white square, for example 55. A pixel shown in the pattern by a dark-shaded square, for example 56, may correspond to a glyph pixel in a glyph pixel, and a pixel shown by line-hatching, for example 57, may correspond to a "don't care" pixel.

Figure 7:
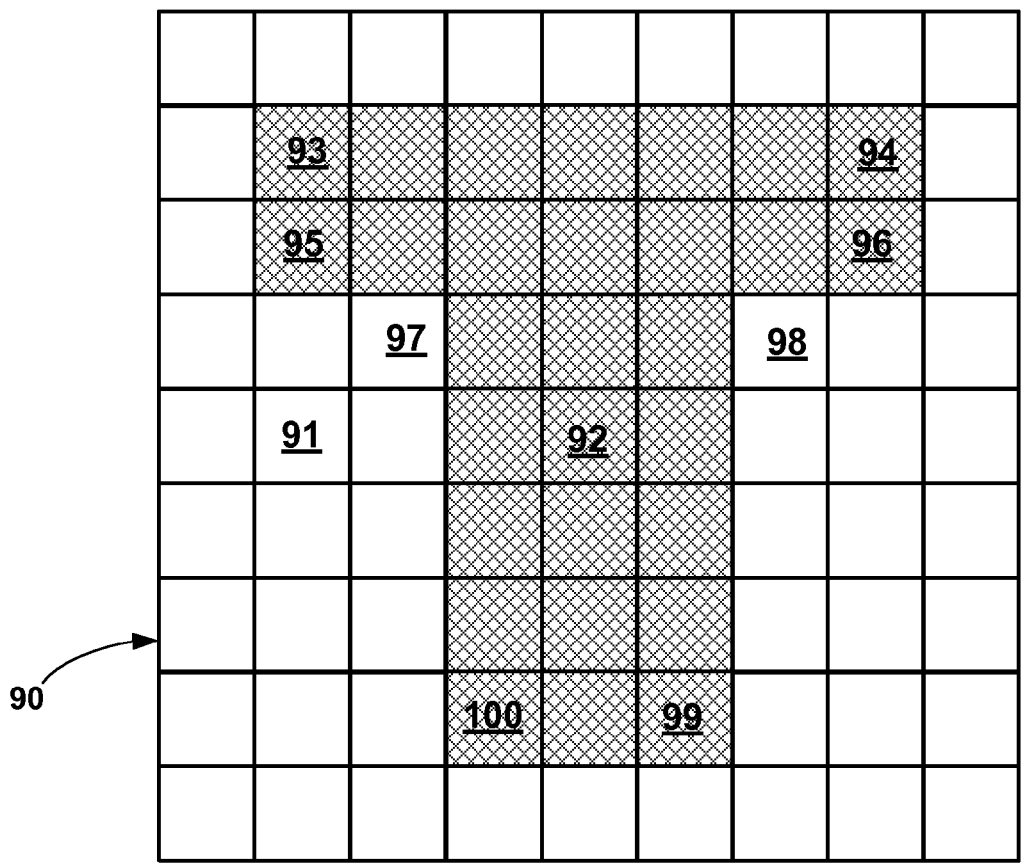
FIG. 7 is a drawing showing an exemplary glyph component.

The above-described feature points may be illustrated in relation to an exemplary glyph component 90 shown in FIG. 7. Non-glyph pixels are those shown as white squares, for example 91, and glyph pixels are those shown in cross-hatch, for example 92. Pixel 93 may be a feature point associated with both the "upward pointing" feature and the "leftward pointing" feature. Pixel 94 may be a feature point associated with both the "upward pointing" feature and the "rightward pointing" feature. Pixel 95 may be a feature point associated with both the "downward pointing" feature and the "leftward pointing" feature. Pixel 96 may be a feature point associated with both the "downward pointing" feature and the "rightward pointing" feature. Pixel 97 may be a feature point associated with the "down-left open" feature. Pixel 98 may be a feature point associated with the "down-right open" feature. Pixel 99 may be a feature point associated with the both the "downward pointing" feature and the "rightward pointing" feature. Pixel 100 may be a feature point associated with the "downward pointing" feature and the "leftward pointing" feature.

In some embodiments of the present invention, the frequency of occurrence of the pixel-pattern-based features and their relative location for a glyph component may be combined with those of other glyph components to form region or page statistics. The region or page statistics may give a more robust estimate of orientation.

In some embodiments of the present invention, a pixel-pattern-based feature and relative location occurrence may be accumulated into a distribution matrix where the quadrant location indexes the matrix row and the pixel-pattern-based feature indexes the column. For each feature occurrence within a glyph component, which may be denoted g, the corresponding element in the distribution matrix for the glyph component, which may be denoted $dm_g$, may be accumulated.

For the eight exemplary pixel-pattern features described in relation to FIGS. 6A-6H above, the distribution matrix $dm_g$ may take the form:

$$dm_g = \begin{pmatrix} e_{1,1} & e_{1,2} & e_{1,3} & e_{1,4} & e_{1,5} & e_{1,6} & e_{1,7} & e_{1,8} \\ e_{2,1} & e_{2,2} & e_{2,3} & e_{2,4} & e_{2,5} & e_{2,6} & e_{2,7} & e_{2,8} \\ e_{3,1} & e_{3,2} & e_{3,3} & e_{3,4} & e_{3,5} & e_{3,6} & e_{3,7} & e_{3,8} \\ e_{4,1} & e_{4,2} & e_{4,3} & e_{4,4} & e_{4,5} & e_{4,6} & e_{4,7} & e_{4,8} \end{pmatrix}$$

where an element $e_{i,j}$ in $dm_g$ may represent the number of times the pixel-pattern-based feature j, where each j corresponds to one of the eight pixel-pattern-based features, occurred in quadrant for the glyph component g. For a kth region, an accumulated distribution matrix, which may be denoted $DM_k$, may be the element-wise sum of all glyph component distribution matrices within the region $R^k$. This may be denoted $$DM_k = \sum_{\forall g \subseteq R^k} dm_g, \text{ where, } e_{i,j}^k = \sum_{g \subseteq R^k} e_{i,j}(g).$$

There may exist a relationship between the distribution matrix, $dm_g$, of a glyph component and the distribution matrix of glyph component comprised of a rotation of the glyph component. For the eight exemplary pixel-pattern features described in relation to FIGS. 6A-6H above and the exemplary quadrant decompositions illustrated in FIGS. 5A-5B, the elements in a distribution matrix for a glyph component will permute according to:

$$\begin{pmatrix} e_{4,4} & e_{4,1} & e_{4,2} & e_{4,3} & e_{4,8} & e_{4,5} & e_{4,6} & e_{4,7} \\ e_{1,4} & e_{1,1} & e_{1,2} & e_{1,3} & e_{1,8} & e_{1,5} & e_{1,6} & e_{1,7} \\ e_{2,4} & e_{2,1} & e_{2,2} & e_{2,3} & e_{2,8} & e_{2,5} & e_{2,6} & e_{2,7} \\ e_{3,4} & e_{3,1} & e_{3,2} & e_{3,3} & e_{3,8} & e_{3,5} & e_{3,6} & e_{3,7} \end{pmatrix}$$

for a clockwise rotation of the glyph component by 90°; to:

$$\begin{pmatrix} e_{3,3} & e_{3,4} & e_{3,1} & e_{3,2} & e_{3,7} & e_{3,8} & e_{3,5} & e_{3,6} \\ e_{4,3} & e_{4,4} & e_{4,1} & e_{4,2} & e_{4,7} & e_{4,8} & e_{4,5} & e_{4,6} \\ e_{1,3} & e_{1,4} & e_{1,1} & e_{1,2} & e_{1,7} & e_{1,8} & e_{1,5} & e_{1,6} \\ e_{2,3} & e_{2,4} & e_{2,1} & e_{2,2} & e_{2,7} & e_{2,8} & e_{2,5} & e_{2,6} \end{pmatrix}$$

for a clockwise rotation of the glyph component by 180°; and to:

$$\begin{pmatrix} e_{2,2} & e_{2,3} & e_{2,4} & e_{2,1} & e_{2,6} & e_{2,7} & e_{2,8} & e_{2,5} \\ e_{3,2} & e_{3,3} & e_{3,4} & e_{3,1} & e_{3,6} & e_{3,7} & e_{3,8} & e_{3,5} \\ e_{4,2} & e_{4,3} & e_{4,4} & e_{4,1} & e_{4,6} & e_{4,7} & e_{4,8} & e_{4,5} \\ e_{1,2} & e_{1,3} & e_{1,4} & e_{1,1} & e_{1,6} & e_{1,7} & e_{1,8} & e_{1,5} \end{pmatrix}$$

for a clockwise rotation of the glyph component by 270°, where feature 1 may correspond to the "upward pointing" feature, feature 2 may correspond to the "rightward pointing" feature, feature 3 may correspond to the "downward pointing" feature, feature 4 may correspond to the "leftward pointing" feature, feature 5 may correspond to the "up-right open" feature, feature 6 may correspond to the "down-right open" feature, feature 7 may correspond to the "down-left open" feature and feature 8 may correspond to the "up-left open" feature.

In some embodiments of the present invention, due to the relationships between distribution matrices, a training method may train on a single document orientation to produce distribution matrices for all four cardinal orientations.

In some embodiments of the present invention, pixel-pattern-based features may be used for language or language family identification. A useful statistic for language, or language family determination, may be the distribution of the number of pixel-pattern-based features found on glyph components over a region or page. For a variety of language families, the glyph component set for each different written language may produce a different distribution of the number of features per glyph component. For example, in Latin alphabet systems, the characters tend to have a fewer number of pixel-pattern-based features per character than Asian languages.

Figure 8:
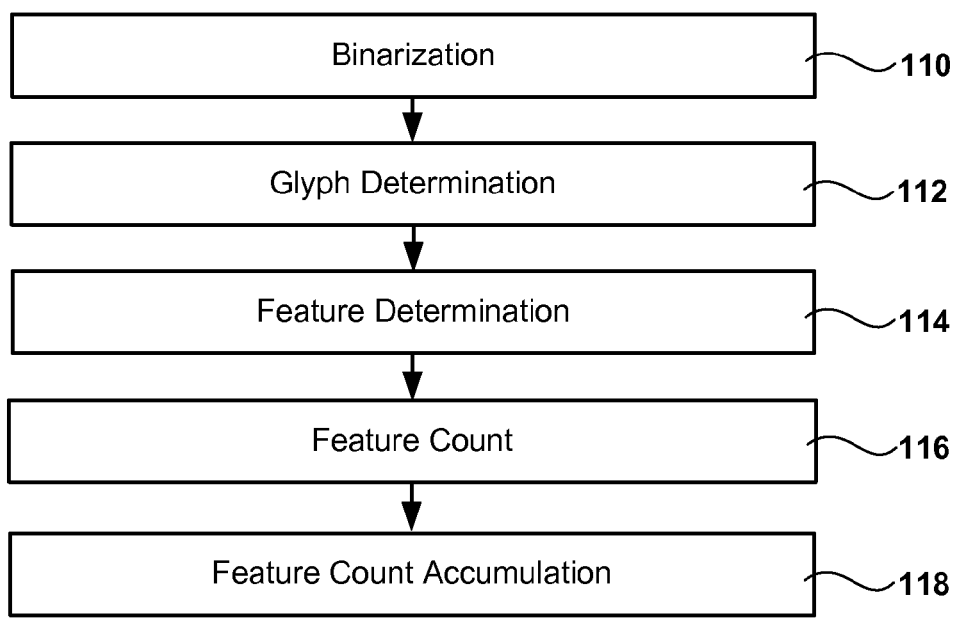
FIG. 8 is chart showing embodiments of the present invention comprising feature count.

In some embodiments of the present invention described in relation to FIG. 8, the distribution of the number of features per glyph component may be determined. After binarization 110, glyph component determination 112, and feature determination 114 for each glyph component, the number of features may be counted 116 for each glyph component, the number of features per component may be accumulated 118 to form a distribution feature for the region or page. The accumulation array may be considered a histogram, also considered a distribution vector, DV, wherein each bin in the histogram, or element in the vector, may accumulate the number of glyph components comprising the number of pixel-pattern-based features associated with the bin. The distribution vector may be determined according to:

---

1. DV = 0 /* initialize distribution vector to zero */
2. for all glyph components within a region $R^k$ num_features$_g = \sum_i \sum_j e_{i,j}$ /* sum number of features for a glyph */
   DV(num_features$_g$) = DV(num_features$_g$) + 1 /* accumulate a count for bin corresponding to number of features in the glyph */,

--- where 0 is the zero vector.

The distribution feature may be used in some embodiments of the present invention to determine the language or language family of the written text in the electronic document.

Figure 9:
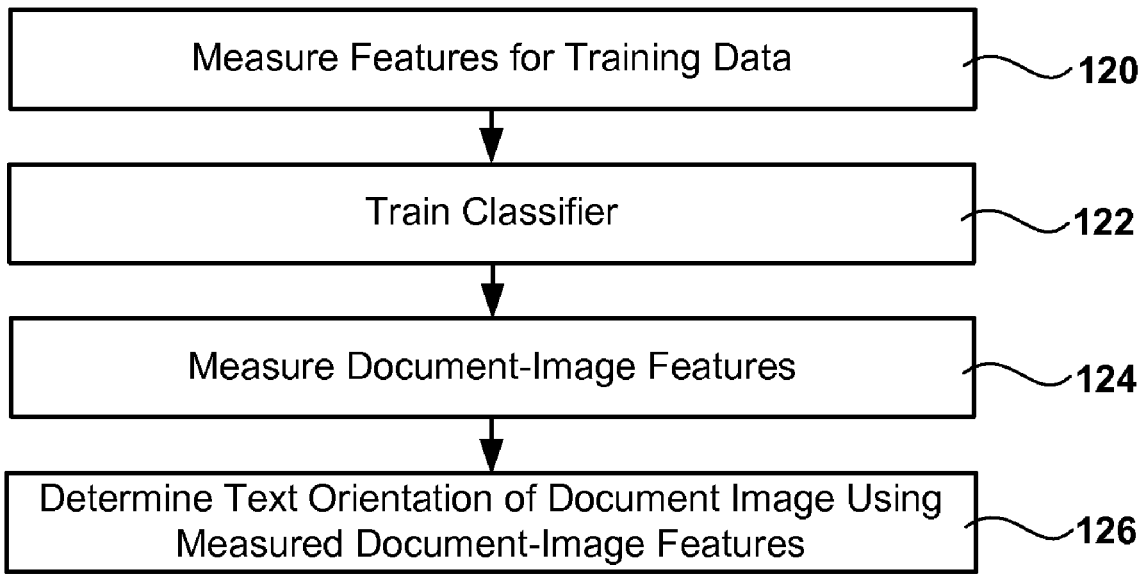
FIG. 9 is a chart showing embodiments of the present invention comprising supervised training for document orientation detection.

Some embodiments of the present invention described in relation to FIG. 9 may comprise text orientation determination based on a supervised-training method. In these embodiments, features may be measured 120 for a training data set, a classifier may be trained 122 using the measurements made for the training data set and a supervised labeling of the orientation of the training data. Feature measurements may then be made 124 on a document image, and the document orientation may be determined 126 using the trained classifier and the document-image features.

Figure 10:
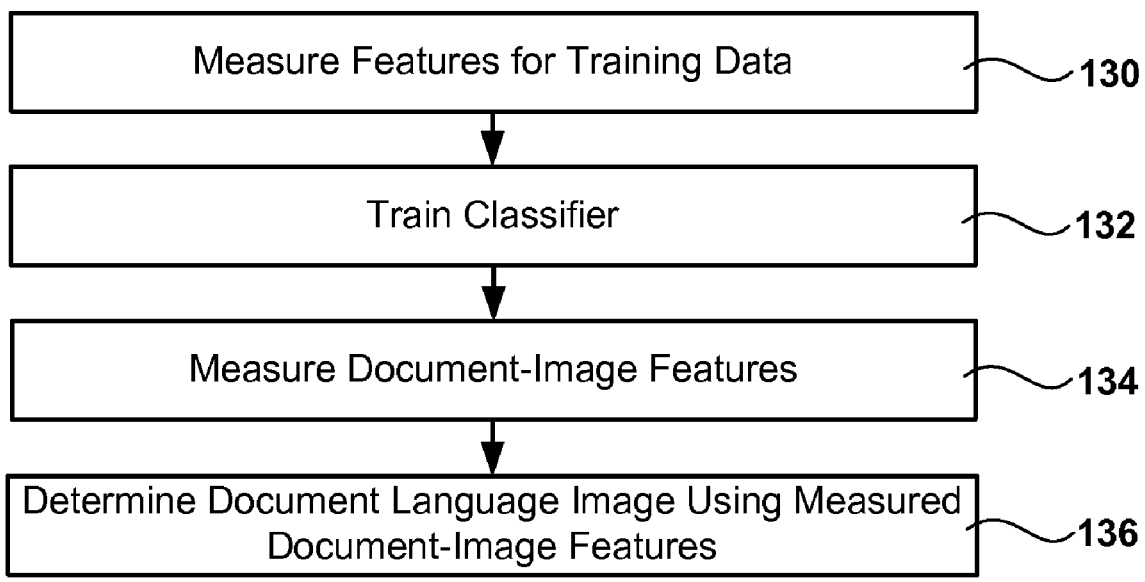
FIG. 10 is a chart showing embodiments of the present invention comprising supervised training for language detection.

Some embodiments of the present invention described in relation to FIG. 10 may comprise text language determination based on a supervised-training method. In these embodiments, features may be measured 130 for a training data set, a classifier may be trained 132 using the measurements made for the training data set and a supervised labeling of the language of the training data. Feature measurements may then be made 134 on a document image, and the document language may be determined 136 using the trained classifier and the document-image features.

In some embodiments of the present invention, a prototypical distribution matrix and distribution vectors for each language family may be used for classifier training. The prototypical distributions may be generated by supervised training on a set of typical documents from a plurality of language families.

A prototypical distribution may be determined by averaging the normalized distributions over the training set for each language. In some embodiments of the present invention, orientation and language labels for a training data may be carried as meta-data associated with the binarized image data portion of the training data. In some embodiments of the present invention, the training method may normalize the training data to be from a reference orientation, for example, the "readable" orientation, also considered the "up" orientation. This distribution matrix may be denoted $DM_{n,D=U}$ for the nth training sample in the reference orientation. A training sample may comprise a region or page of a document image. Each training distribution matrix for a language may be normalized to obtain the distribution matrix, which may be denoted $\overline{DM}_{n,D=U}$, according to:

$$\overline{DM}_{n,D=U} = \frac{DM_{n,D=U}}{\sum_i \sum_j e_{i,j}^n}.$$

In alternative embodiments, the normalized value may be generalized to be a value other than unity according to:

$$\overline{DM}_{n,D=U} = \frac{C}{\sum_i \sum_j e_{i,j}^n} DM_{n,D=U},$$

where C may be predefined constant.

The prototypical distribution matrix may be obtained by averaging each element in matrix across the training samples for a language or language family, which may be denoted F, according to:

$$\overline{DM}_{F,D=U} = \sum_{\forall n \subseteq F} \overline{DM}_{n,F,D=U},$$

where n may indicate a training sample for language family F in the reference orientation.

Distribution matrices for other orientations may be determined based on permutations of the distribution matrix corresponding to the reference orientation. In some embodiments of the present invention, the reference orientation may be the "readable" orientation. In alternative embodiments, the reference orientation may be associated with an orientation other than the "readable" orientation.

In some embodiments of the present invention, prototypical distribution vector for each language family may be determined from training samples according to $$\overline{DV}_n = \frac{DV_n}{\sum_i \sum_j e_{i,j}^n} \text{ and } \overline{DV}_F = \sum_n \overline{DV}_n,$$

where n may denote the nth training sample and F may denote the language family distribution which may determined by averaging across multiple training samples. The distribution vectors do not depend on orientation.

In some embodiments of the present invention, the classifier may be a best-match detector. A page orientation detection module may use the prototypical distributions calculated from training to identify the page orientation, the language or language family, and a confidence value. In some embodiments of the present invention, the confidence value may be used to reject the estimated page orientation. In alternative embodiments, the information calculated during a page orientation matching stage may be merged with an additional information from other sources related to orientation. Exemplary information calculated during a page orientation matching stage may comprise the confidence measure for all likely matches.

Figure 11:
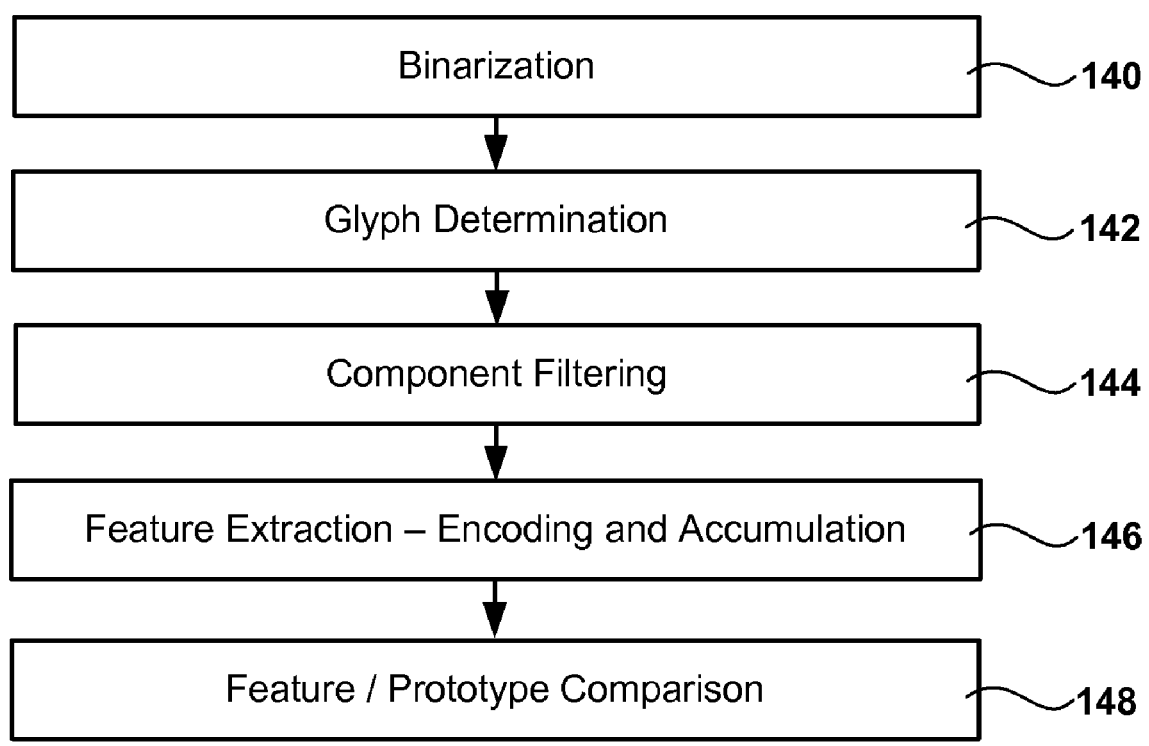
FIG. 11 is a chart showing embodiments of the present invention comprising prototype matching.

Some embodiments of the present invention may be described in relation to FIG. 11. A document image may be binarized 140, and glyph component candidates may be determined 142. The binarized, glyph component candidate results may be filtered 144 to reject components that do not conform to an expected glyph component structure. The result may be a binary glyph map comprising glyph components. Features may be extracted 146 from the glyph map thereby producing normalized distributions $\overline{DM}$ and $\overline{DV}$. These distributions may be compared with prototypical language and orientation distributions that may be calculated in an offline training procedure.

In some embodiments of the present invention, the comparison may generate a match score according to the correlation $\overline{DM} \cdot \overline{DM}_{F,D}$ between the measured distribution, $\overline{DM}$, and a prototypical distribution, $\overline{DM}_{F,D}$. Correlation may be defined according to:

$$\overline{DM} \cdot \overline{DM}_{F,D} = \sum_i \sum_j e_{i,j} \cdot e_{i,j}^{F,D},$$

the sum of the element-wise product between two matrices. For unit-normalized matrices the match score may vary from zero to one, where zero may represent a worst match and one a best match. The best-match comparison may generate match scores for all orientation and language/language family combinations. The best match may be determined according to:

$$(d, f) = \max_{D,F}\left(\sum_i \sum_j e_{i,j} \cdot e_{i,j}^{F,D}\right),$$

where D may be the orientations and F the language families. Thus, (d, f) may identify the prototypical distribution with the highest correlation score with the measured data.

In alternative embodiments of the present invention, a match score may be generated according to the sum of the absolute difference between two matrices according to:

$$\sum_i \sum_j |e_{i,j} - e_{i,j}^{F,D}|.$$

In these embodiments, zero may be the best match while one may be the worst match. The best-match comparison may generate match scores for all orientation and language\language family combinations. The best match may be determined according $$(d, f) = \min_{D,F}\left(\sum_i \sum_j |e_{i,j} - e_{i,j}^{F,D}|\right),$$

where D may be the orientations and F the language families. Thus, (d, f) may identify the prototypical distribution with the smallest difference from the measured data.

In some embodiments of the present invention, the match score for language identification using the distribution vector may be determined by the correlation, $\overline{DV} \cdot \overline{DV}_F$. In alternative embodiments, the match score may be determined by the sum of the absolute difference, $\Sigma \overline{DV} - \overline{DV}_F$. The best match strategy for language identification may be given according to:

$$(f) = \max_F(\overline{DV} \cdot \overline{DV}_F)$$

for correlation and $$(f) = \min_F\left(\sum \overline{DV} - \overline{DV}_F\right)$$

for sum of absolute difference.

In some embodiments of the present invention, language classification may be performed prior to orientation detection. In these embodiments, the scope of language families used in orientation detection may be limited based on the prior language classification.

In alternative embodiments of the present invention, language determination and orientation detection may be determined in parallel, and the distribution matrix matches and matching strategy may return cues useful for both orientation and language family determination. This information may be combined with specialized language family matching. In some embodiments, the combination strategy may comprise a weighting of match scores. In alternative embodiments, the match scores may be input to a classifier.

Embodiments of the present invention have been described above in relation to a best-match detector. Alternative embodiments of the present invention may comprise classifiers based on pattern recognition methods.

Alternative learning methods including Neural Networks, Support Vector Machines (SVM), Hidden Markov Models (HMM) and other may be used in conjunction with the pixel-pattern-based features and encoding described herein to determine orientation and language.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for determining an image characteristic in a digital image, said method comprising:
  forming a binary image from a digital image;
  determining a first glyph component in said binary image;
  determining a first reference location for said first glyph component;
  determining a first feature location, in said first glyph component, associated with a first feature, wherein said first feature is associated with a first pattern comprising a plurality of glyph pixels, a plurality of non-glyph pixels and at least one don't care pixel, and wherein said determining a first feature location comprises matching a pixel region comprising a pixel in said first glyph component and a plurality of pixels surrounding said pixel to said first pattern, wherein said pixel is a first feature location when all glyph pixels in said plurality of glyph pixels correspond to glyph pixels in said pixel region and all non-glyph pixels in said plurality of non-glyph pixels correspond to non-glyph pixels in said pixel region;
  determining a first position, relative to said first reference location, of said first feature location, wherein said first position indicates in which quadrant, relative to said first reference location, said first feature location is located;
  accumulating, in a first distribution counter, a frequency-of-occurrence count related to said first feature and said first position; and
  determining an image characteristic based on a distribution feature, wherein said distribution feature is based on said first distribution counter.

2. A method according to claim 1 further comprising determining a confidence level associated with said image characteristic.

3. A method according to claim 1, wherein said determining an image characteristic comprises inputting said distribution feature to a classifier which has been previously trained.

4. A method according to claim 1 further comprising:
   determining a second feature location, in said first glyph component, associated with a second feature, wherein said second feature is associated with a second pattern;
   determining a second position, relative to said first reference location, of said second feature location, wherein said second position indicates in which quadrant, relative to said first reference location, said second feature location is located; and
   accumulating, in said first distribution counter, a frequency-of-occurrence count related to said second feature and said second position.

5. A method according to claim 1, wherein said first reference location is the centroid of said first glyph component.

6. A method according to claim 1, wherein said determining a first reference location comprises:
   determining a first bounding box for said first glyph component; and
   determining the center of said first bounding box.

7. A method according to claim 1, wherein said determining a first position comprises a quadrant decomposition based on said first reference location.

8. A method according to claim 1, wherein said image characteristic is an orientation characteristic.

9. A method according to claim 1, wherein said image characteristic is a language characteristic.

10. A method according to claim 1 further comprising:
    determining a second glyph component in said binary image;
    determining a second reference location for said second glyph component;
    determining a second feature location, in said second glyph component, associated with said first feature;
    determining a second position, relative to said second reference location, of said second feature location, wherein said second position indicates in which quadrant, relative to said second reference location, said second feature location is located; and
    accumulating, in a second distribution counter, a frequency-of-occurrence count related to said first feature and said second position.

11. A method according to claim 10 further comprising combining said second distribution counter and said first distribution counter to form said distribution feature.

* * * * *